US009651108B2

(12) United States Patent
Lamminger

(10) Patent No.: US 9,651,108 B2
(45) Date of Patent: May 16, 2017

(54) LATCHING DEVICE FOR A ROTATIONALLY OR TRANSLATIONALLY MOVABLE OPERATOR CONTROL ELEMENT

(71) Applicant: Behr-Hella Thermocontrol GmbH, Stuttgart (DE)

(72) Inventor: Egbert Lamminger, Soest (DE)

(73) Assignee: Behr-Hella Thermocontrol GmbH, Stuttgart (DE)

( * ) Notice: Subject to any disclaimer, the term of this patent is extended or adjusted under 35 U.S.C. 154(b) by 0 days.

(21) Appl. No.: 14/362,672

(22) PCT Filed: Dec. 4, 2012

(86) PCT No.: PCT/EP2012/074340
§ 371 (c)(1),
(2) Date: Jun. 4, 2014

(87) PCT Pub. No.: WO2013/083554
PCT Pub. Date: Jun. 13, 2013

(65) Prior Publication Data
US 2014/0360313 A1    Dec. 11, 2014

(30) Foreign Application Priority Data

Dec. 6, 2011 (DE) .................. 10 2011 087 829

(51) Int. Cl.
*G05G 1/00* (2006.01)
*F16D 71/04* (2006.01)
(Continued)

(52) U.S. Cl.
CPC .............. *F16D 71/04* (2013.01); *G01S 11/14* (2013.01); *G01S 15/931* (2013.01);
(Continued)

(58) Field of Classification Search
CPC ............. F16D 71/04; G05G 1/10; H01H 3/08
(Continued)

(56) References Cited

U.S. PATENT DOCUMENTS 5,819,597 A * 10/1998 Sato et al. ................... 74/553
7,767,916 B2 * 8/2010 Kurihara et al. ........... 200/38 R
(Continued)

FOREIGN PATENT DOCUMENTS

DE    10 2009 048330 A1    3/2004
DE       103 05 668 A1    3/2004
(Continued)

*Primary Examiner* — Vicky Johnson
(74) *Attorney, Agent, or Firm* — Christensen Fonder Dardi; Peter S. Dardi

(57) ABSTRACT

The latching device for a rotationally or translationally movable operating element is provided with a resiliently mounted latching projection and with a latching guideway which is in sliding contact with the latching projection and which has a plurality of latching depressions with latching elevations arranged between them. The latching depressions and the latching elevations form a substantially corrugated latching path along which the latching projection slides during a relative movement between latching guideway and latching projection. The latching projection has a surface which contacts the latching path along at least one contact line running substantially transversely to the longitudinal extent of the latching path. When sliding along the latching path, the latching projection experiences an upward and downward movement with periodic change of the orientation of its contact line with respect to the latching guideway.

6 Claims, 7 Drawing Sheets

Figure 1:
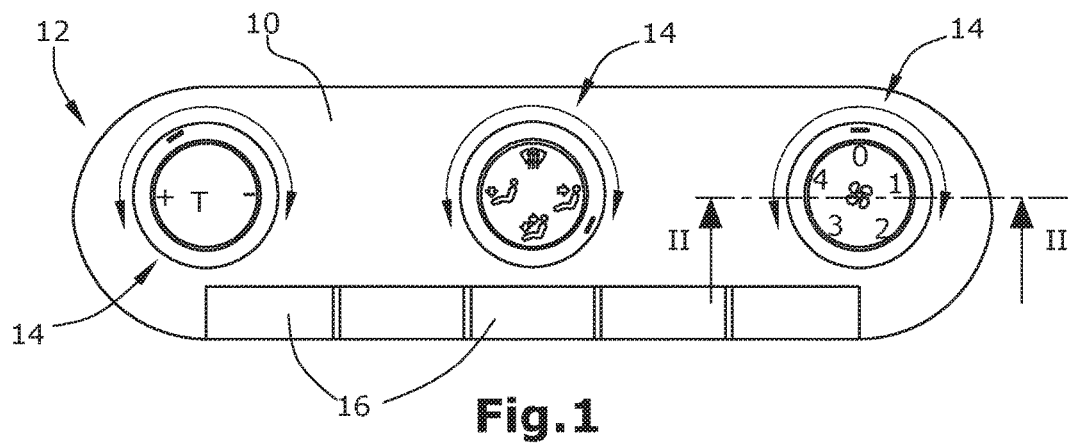

(51) Int. Cl.
*G01S 11/14* (2006.01)
*G01S 15/93* (2006.01)
*G01S 7/526* (2006.01)

(52) U.S. Cl.
CPC ..... *B60W 2420/54* (2013.01); *B60W 2550/10* (2013.01); *G01S 7/526* (2013.01); *Y10T 74/2141* (2015.01)

(58) Field of Classification Search
USPC .............. 74/10 R, 10.41, 553, 578; 267/158; 200/11 R, 11 G
See application file for complete search history.

(56) References Cited

U.S. PATENT DOCUMENTS

| | | | |
|---|---|---|---|
| 8,028,593 B2 * | 10/2011 | Miura et al. | 74/10.41 |
| 2008/0197004 A1 * | 8/2008 | Ishigaki et al. | 200/336 |
| 2008/0289439 A1 * | 11/2008 | Miura et al. | 74/10.41 |

FOREIGN PATENT DOCUMENTS

| | | | | |
|---|---|---|---|---|
| DE | 102 36 066 A1 | | 9/2004 | |
| DE | 103 23 544 A1 | | 12/2004 | |
| DE | 10 2006 036 636 A1 | | 2/2007 | |
| DE | 10 2007 013 383 B3 | | 9/2008 | |
| FR | 1439874 A | * | 5/1966 | ............. B60K 37/06 |
| JP | 08222413 A | * | 8/1996 | ............. H01C 10/32 |
| JP | 09063812 A | * | 3/1997 | ............. H01C 10/00 |

* cited by examiner

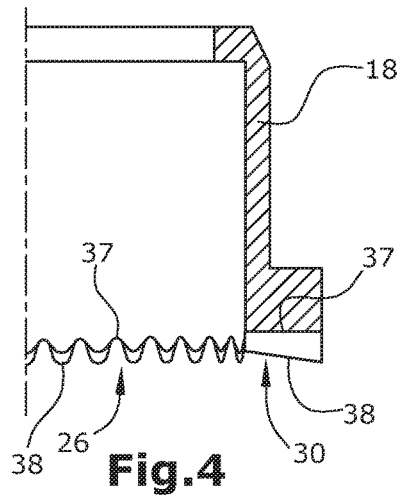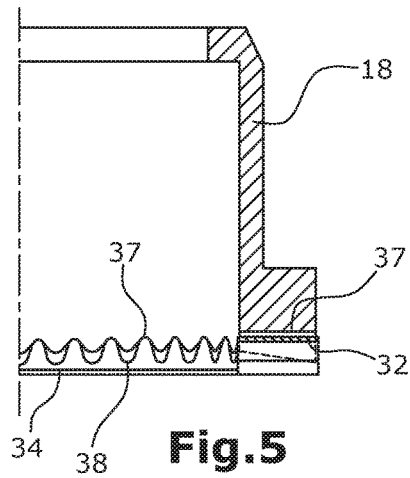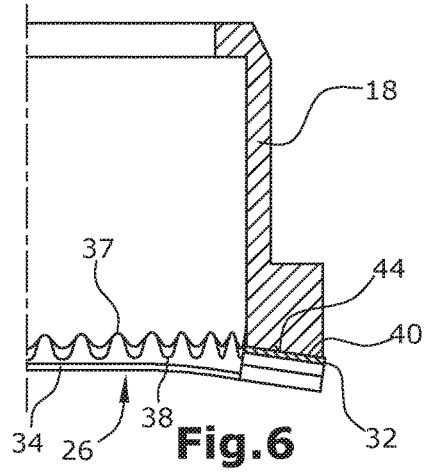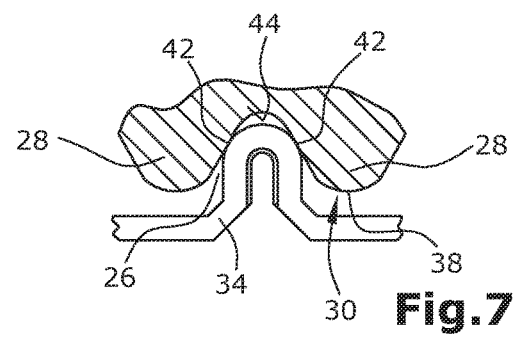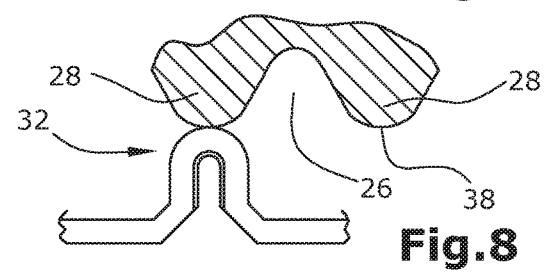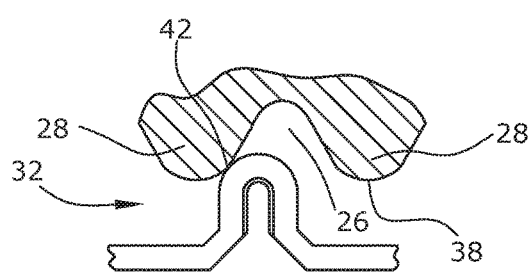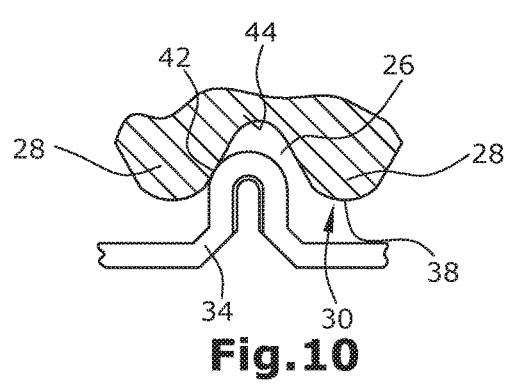

LATCHING DEVICE FOR A ROTATIONALLY OR TRANSLATIONALLY MOVABLE OPERATOR CONTROL ELEMENT

CROSS REFERENCE TO RELATED APPLICATIONS

This application is a national phase filing of PCT Application Number PCT/EP2012/074340 filed on Dec. 4, 2012, which claims priority to German Patent Application Number 102011087829.7 filed Dec. 6, 2011, both of which are hereby incorporated herein by reference.

The invention relates to a latching device for a rotationally or translationally movable operating element.

For manual operation of electric or electronic appliances, operating units are used which comprise operating elements in various configurations. Apart from depressible key elements, slide switches or the like, increasing use is made—particularly in operating units of vehicles—of so-called control dials, i.e. rotatable operating elements. In rotatable and translationally rotatable operating elements, it is desirable that the person actuating the operating element is given an acoustic and/or tactile feedback in relation to a performed adjustment of the operating element. In this regard, latching devices have been found useful which, apart from this aspect, have the advantage that the operating element, once the position has been adjusted, will automatically maintain the adjustment position. Further, latching devices will generate a more or less clearly perceivable latching sound and give a tactile feedback to the person actuating the operating element.

Latching devices for operating elements of the above type are described e.g. in DE 10 2007 013 383 B3, DE 10 2006 036 636 A1, DE 102 36 066 A1 and DE 103 23 544 A1.

Known latching devices are operative by means of a latching projection supported in a spring-elastic manner and being in sliding contact with a latching guideway comprising a plurality of latching depressions with latching projections arranged therebetween. In the normal case, the latching guideway is formed as a wave-shaped latching path comprising a continuous uniform surface or sectionwise plane (facet) surfaces.

Due to its elastic support, the latching projection, when sliding over the latching path, will perform upward and downward movements. Normally, the latching projection is a part of a spring arm which—when viewing the latching guideway—is supported externally of the latter. In such an arrangement, the orientation of the surface of the latching projection relative to the surface of the latching path will change when, upon actuation of the operating element, the latching projection is sliding along on the latching guideway.

Normally, the surface of the latching projections is spherical. Further, the site of contact between the latching projection and the latching guideway is conventionally designed as a point-shaped contact zone. The latching projection is in most cases made of metal and is crimp-shaped, while the latching guideway is normally made of plastic. As a result, the latching guideway is subjected to wear caused by the latching projection which is sliding along on it. By application of lubricants (such as e.g. grease), an effort is made to reduce these wear phenomena.

The latching sound is generated by a pulse-like contacting between the latching projection and the latching guideway when the two components are moving relative to each other, which will be the case upon actuation of the operating element. The latching sound can be influenced only conditionally, which is rather complex.

It is an object of the invention to provide a latching device for a rotationally or translationally movable operating element, which device is distinguished by low wear and thus an increased operating life, and by reduced noises and respectively by noises that can be influenced.

To achieve the above object, the invention proposes a latching device for a rotationally or translationally movable operating element wherein the latching device comprises the features defined in claim 1. The subclaims relate to various embodiments of the invention.

An essential feature of the latching device according to the invention is to be seen in that the latching projection is in contact with the latching path, i.e. with the upper side of the latching guideway, along at least one line zone and respectively line. Therein, this line contact and respectively each line contact runs substantially transversely to the extension of the latching path. For this purpose, the latching projection comprises a surface which is in contact with the latching path along at least one contact line running substantially transversely to the longitudinal extension of the latching path. This touch along a contact line exists particularly when the latching projection is outside its state of deepest immersion in a latching depression. When immersed farthest in the latching depression, the latching projection is in contact with the surface of the latching path preferably along two contact lines of the above described type, notably on both sides of the deepest latching depression point on the opposite flanks which lead from the deepest point of the latching depression to the highest points (vertices) of the respective adjacent latching elevations.

When sliding along the latching path, the latching projection will perform an upward and downward movement with periodic change of the inclination of its contact line relative to the latching guideway. Now, to make it possible that this contact line as a line contact between the latching projection and the latching guideway will always be maintained, it is provided according to the invention that the surface of the latching path undergoes a change of inclination following the change of the orientation of the contact line of the latching projection during its upward and downward movement.

By the inventive design of the inclinations of the surface of the latching path in relation to the changed inclination of the surface of the latching projection during its upward and downward movement over the latching guideway, there is achieved continuous line contact between the latching projection and the latching guideway. This results in a reduced surface pressure between the latching projection and the latching guideway and respectively latching path. Thus, it is rendered possible to manufacture the latching guideway from a more wear-prone plastic material and respectively from a plastic material without wear-reducing additives. This in turn makes it possible to reduce the costs for the component parts. In other words, it is made possible, with unchanged choice of materials over conventional latching devices, to reach a longer operating life and thus an increased stability in long operation. Further, by the line contact, a more stable rest position is rendered possible. Thereby, in turn, the bias force by which the latching projection presses against the latching guideway can be reduced, which in turn has a wear- and noise-reducing effect.

By the maintenance of the line contact during the sliding movement of the latching projection over the latching guideway, there occurs, on the whole, a reduction of the thrust pulses that the latching projection exerts on the latching guideway. The reduction of the thrust pulses, apart from reducing wear, also leads to a noise reduction, notably without the need—as customary up to now—to use additional auxiliary substances such as e.g. lubricants, greases or the like in the latching system. Finally, the inventive construction also allows for a reduction of the loss factor (damping factor) as well as a reduction of the reverberation time. All of this has a beneficial effect on the performance and particularly on the haptics and the acoustics of the latching device. Put differently, the approach provided by the invention makes it possible to take influence on a reduction of wear and on the acoustics entailed by a latching device.

According to an advantageous embodiment of the invention, it can be provided that the surface of the latching path which is undergoing changes of its inclination, is formed between the vertices of two adjacent latching elevations as a frustoconical partial surface. By way of alternative, it is possible to replace the frustoconical partial surfaces by plane partial surfaces, notably similar to the lateral surfaces of a pyramid having a polygonal (more than four-cornered) base surface. In this arrangement, the axis of the truncated cone and respectively of the pyramid is arranged substantially transversely to the extension of the latching path. In case that the latching depressions are formed as plane partial surfaces of different inclinations, these comprise a first surface forming the bottom of the latching depression and two second flank and respectively oblique surfaces arranged on both sides of said first surface, which are tilted or inclined to the side.

As already mentioned above, the latching projection is preferably formed as a crimp on a (metallic) spring arm of which one end is fixed and whose other end has the latching projection arranged on it. Such a spring arm which is oriented substantially transversely to the extension of the latching path, will be elastically flexed during the upward and downward movement of its latching projection between its fixed end and the latching projection.

In a spring arm of the above mentioned type, the crimp forming the latching projection is substantially formed as a frustoconical partial surface, with the cone axis arranged substantially transversely to the extension of the latching path and thus substantially in the direction of the spring arm.

However, the spring arm can also be provided as an annular structure. In this case, the annular spring arm substantially follows the course of the latching path (when seen in plan view onto the latching path). Such annular springs are used with preference. Normally, they comprise two fixing areas arranged diametrically opposite each other, wherein, at a displacement of 90° relative to these fixing areas, at least one latching projection or two latching projections are formed. In this embodiment of the invention, said latching projection and respectively each latching projection comprises a crimp resembling a frustoconical partial surface and having a cone axis extending radially relative to the annular shape of the spring arm.

Figure 2:
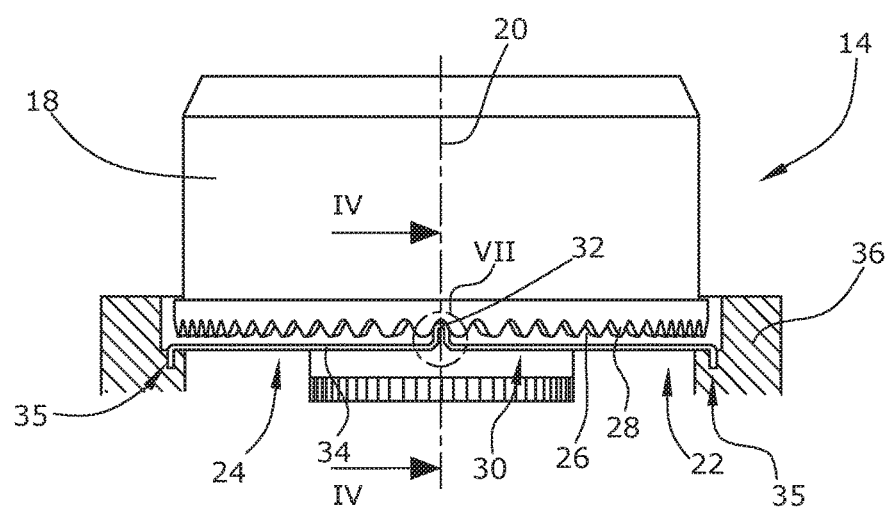
Figure 3:
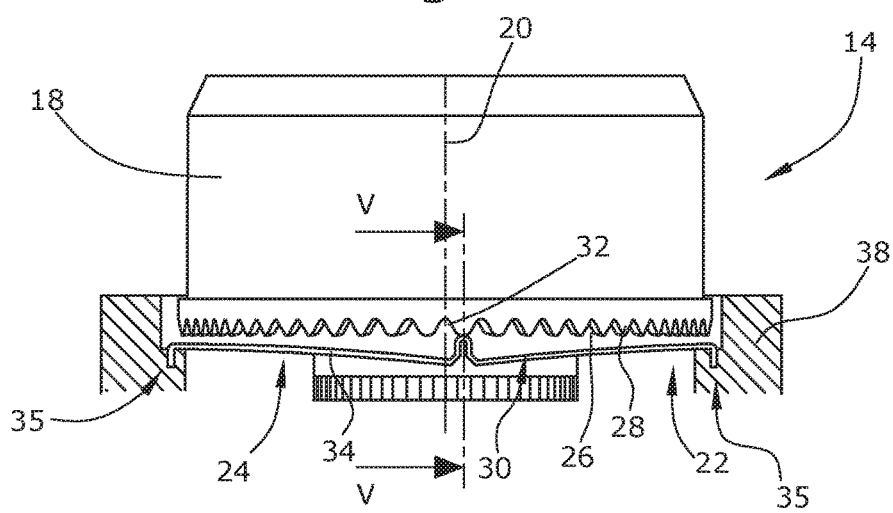
Figure 11:
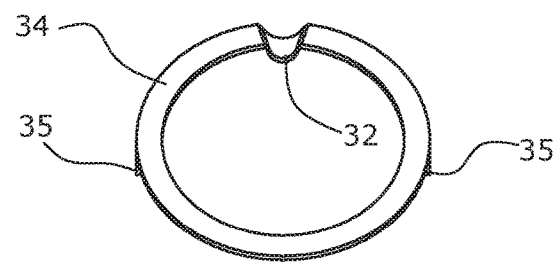
Figure 12:
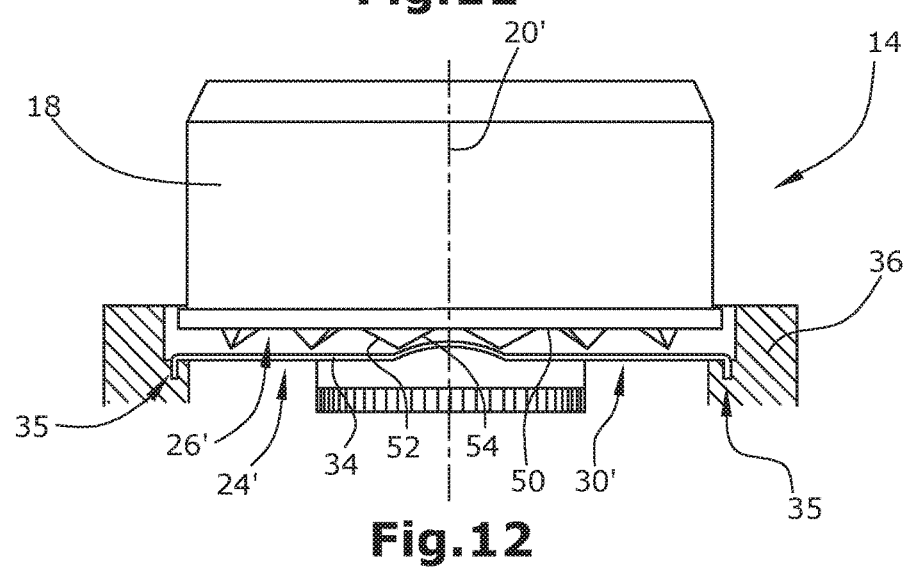
Figure 13:
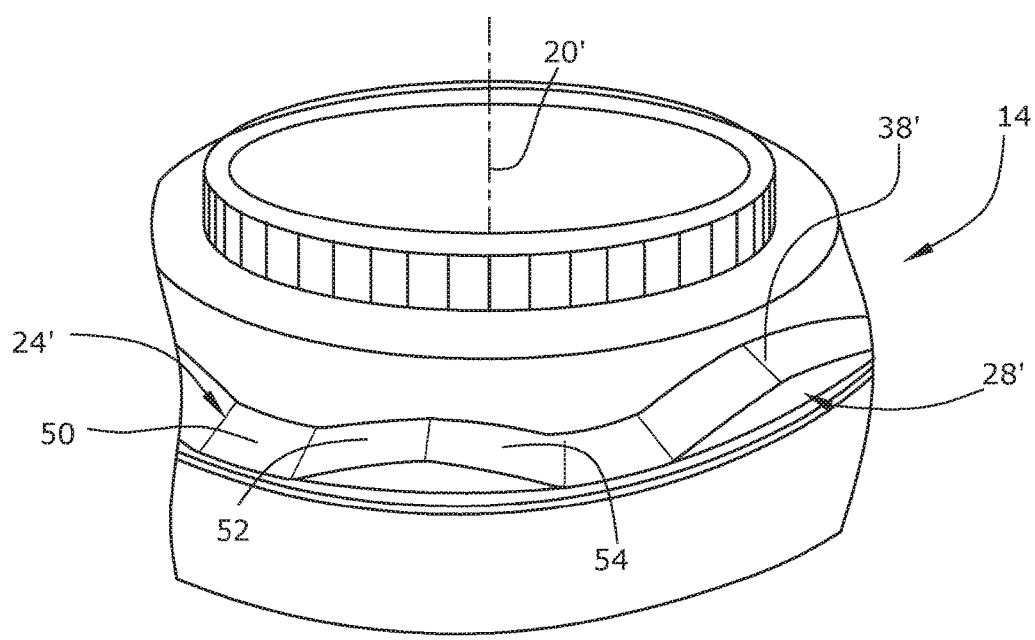
Figure 14:
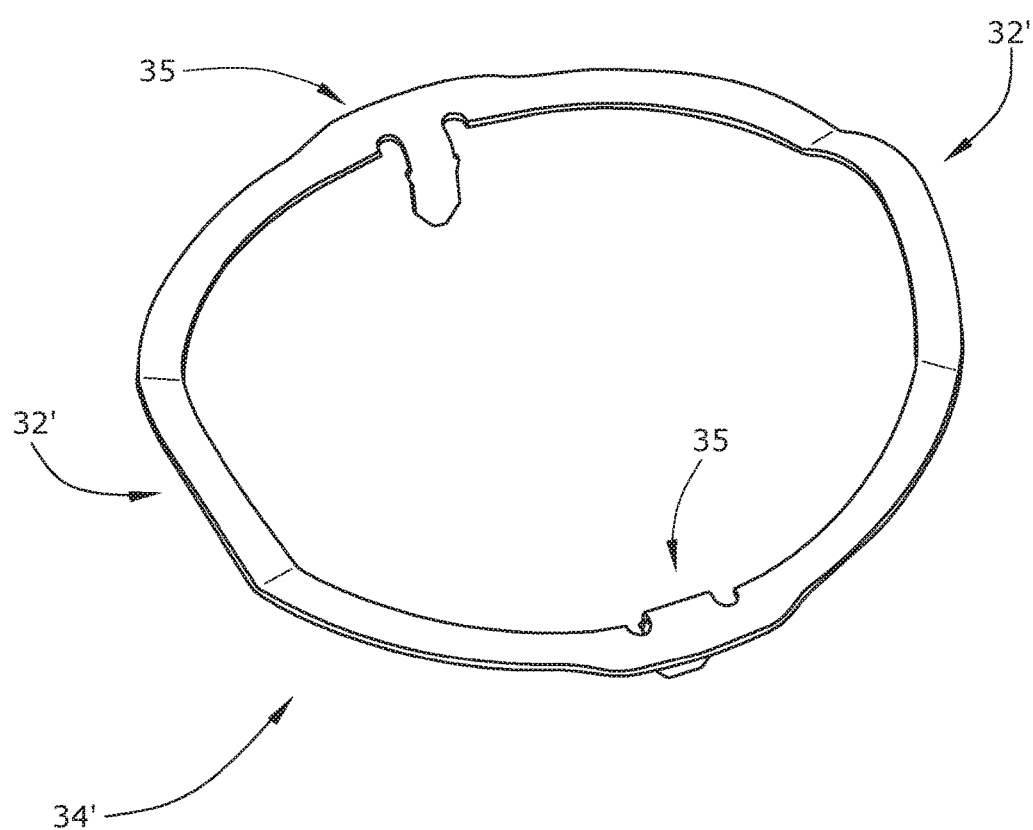
Figure 15:
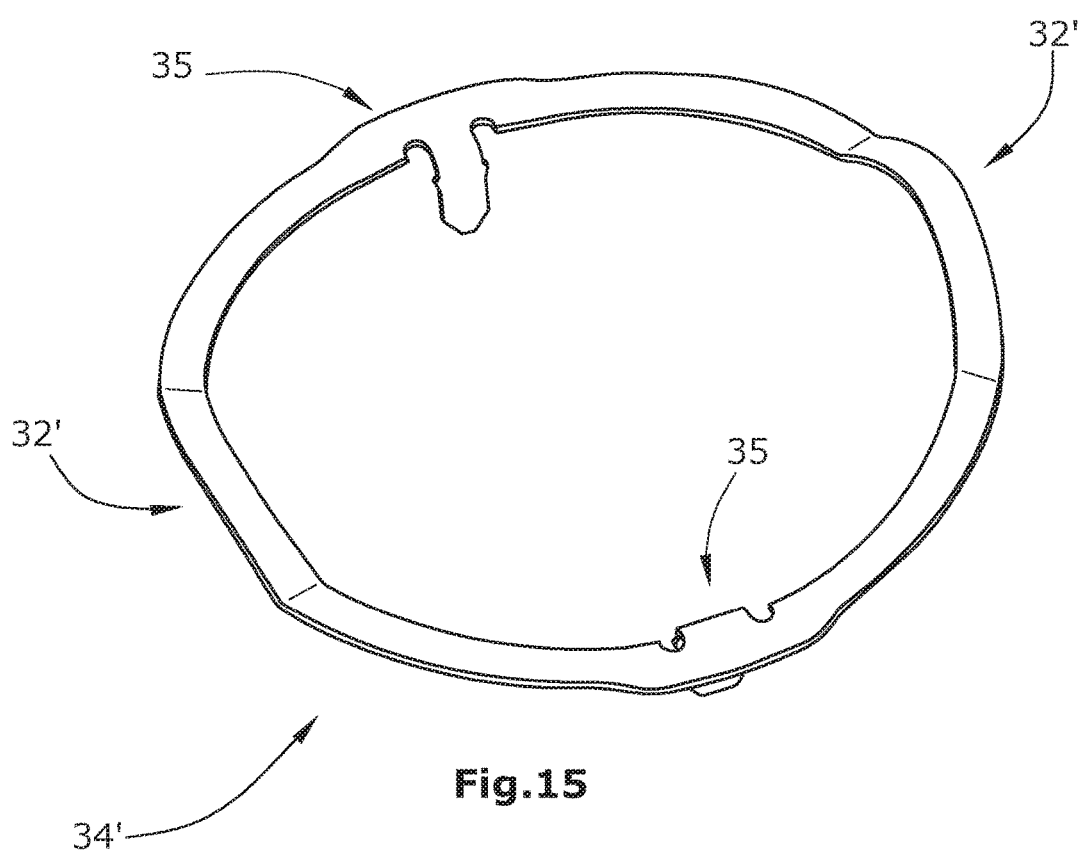
Figure 16:
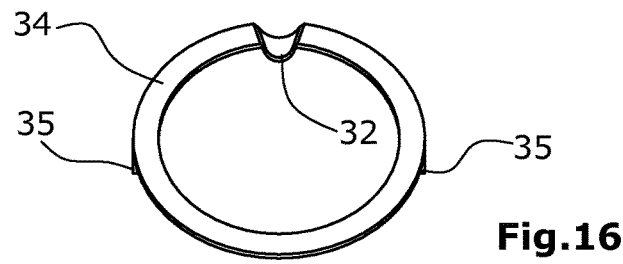
Figure 17:
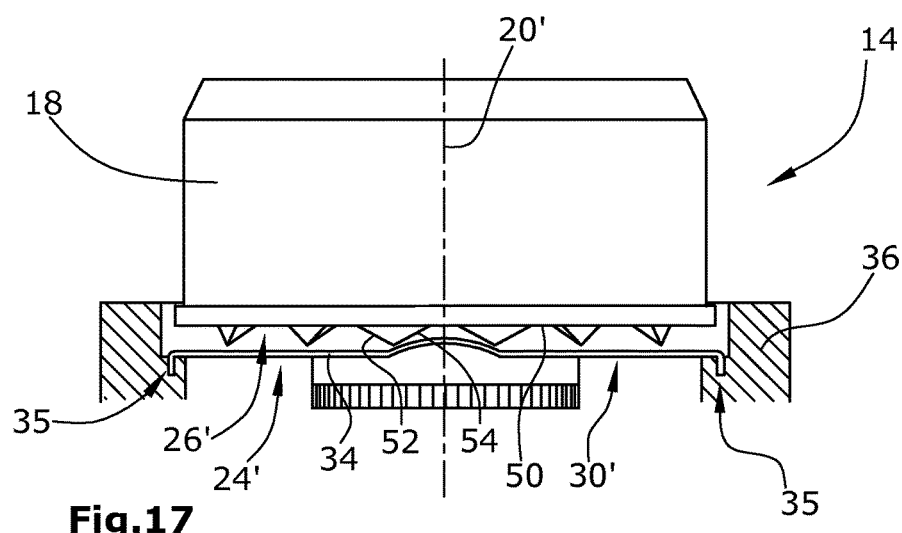
Figure 18:
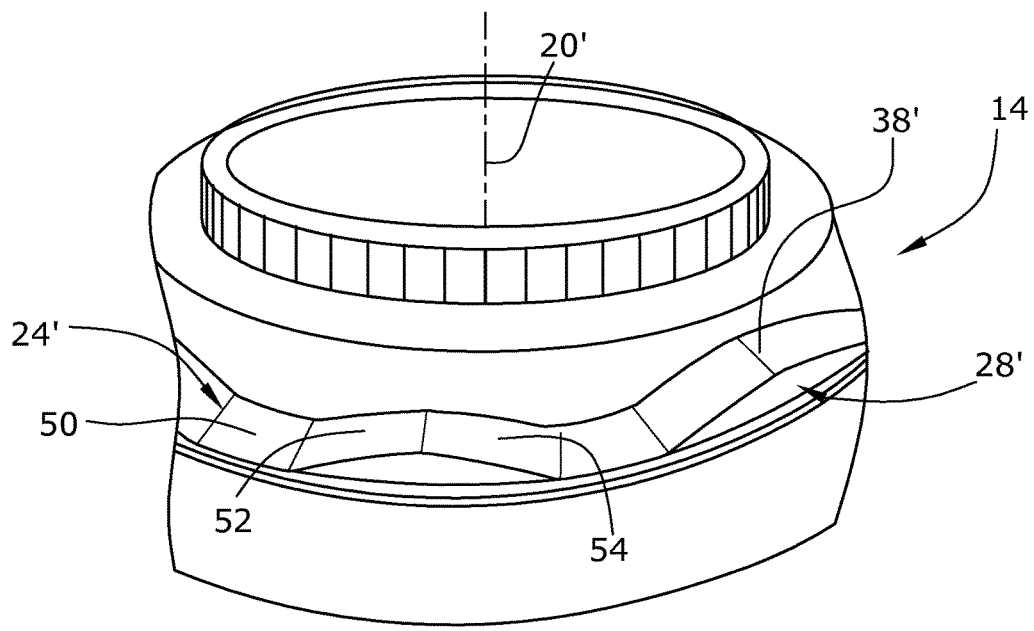
Figure 19:
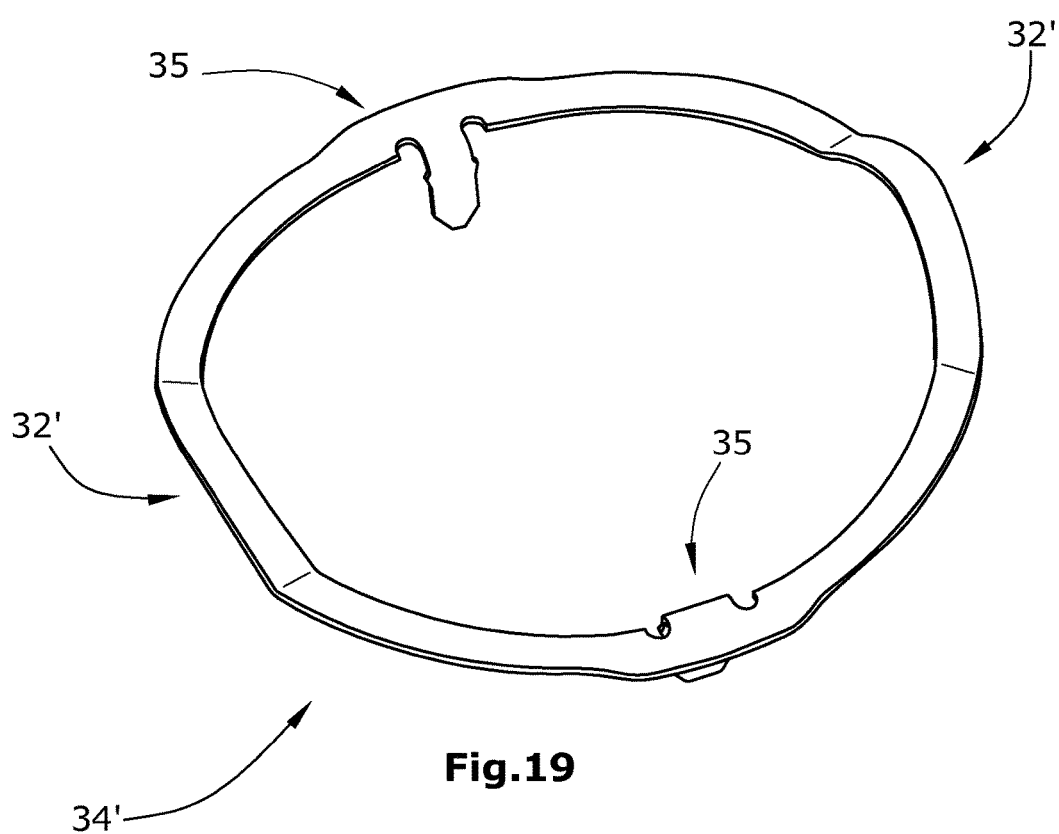

The invention will be explained in greater detail hereunder by way of two exemplary embodiments and with reference to the drawing. In the drawing:

FIG. 1 shows a view onto the front side of a heater system operating unit for a vehicle, FIG. 2 shows a sectional view along the line II-II of FIG. 1 for illustration of the latching device in lateral view, notably in the position in which the latching projection is immersed in a latching depression, FIG. 3 shows a sectional view similar to that of FIG. 2 but in that position of the rotary operating element in which the latching projection is in contact with a latching elevation of the latching device, FIG. 4 shows a sectional view along the line IV-IV of FIG. 2 but without illustration of the latching spring, FIGS. 5 and 6 show sectional views along the lines IV-IV and V-V of FIGS. 2 and 3, FIG. 7 shows an enlarged view of the area marked at VII in FIG. 2 for clarifying that the latching projection in a latching depression is in contact with the latching guideway along two contact lines, FIGS. 8 to 10 show the respective contacting between the latching projection and the latching guideway upon immersion of the latching projection into a latching depression, FIG. 11 shows a side view of a translationally moveable operating element engaging a latching projection, FIG. 12 shows a sectional view of the translationally moveable operating element of FIG. 11 taken along line A-A of FIG. 11, FIG. 13 shows a sectional view of the translationally moveable operating element of FIG. 11 taken along line B-B of FIG. 11, FIG. 14 shows a side view of a translationally moveable operating element of FIG. 11 engaging a latching projection at a latching elevation, FIG. 15 shows a sectional view of the translationally moveable operating element of FIG. 11 taken along line C-C of FIG. 14, FIG. 16 shows a perspective view of an annular latching spring wherein the latching projection crimp is formed as a frustoconical partial surface, Fig. 17 shows a representation similar to that of FIG. 2 but with a latching device of an alternative design, FIG. 18 shows a perspective view of the upper side of the latching guideway in the embodiment of the latching device according to Fig. 17, and FIG. 19 shows a perspective view of the latching spring with latching projection for use in the embodiment according to Fig. 17.

FIG. 1 illustrates, in plan view, the front panel 10 of an operating unit 12 for an air-conditioning or heater system in a motor vehicle. There are shown three rotary dials 14 for setting the temperature, the air distribution and the blower strength. Further, the operating unit 12 comprises various press keys 16. The three rotary dials 14 are provided with latching devices serving, on the one hand, for maintaining the currently taken rotary position and, on the other hand, for transmitting an acoustic and tactile feedback of an adjustment to the person actuating the operating element. The design of the latching device according to a first exemplary embodiment will be described in greater detail hereunder with reference to FIGS. 2 to 11.

Each rotary dial 14 comprises a rotary operating element 18 supported for rotation about a rotary axis 20. On the lower axial end side 22, said rotary operating element 18 comprises a latching guideway 24 which is provided on the end side along the circumference of the rotary operating element 18 and consists of alternately arranged latching depressions 26 and latching elevations 28. Said latching depressions 26 and latching elevations 28 form a latching path 30 along which a latching projection 32, supported in a spring-elastic manner, will slide when the rotary operating element 18 is actuated, i.e. rotated. Said latching projection 32 is a crimp-shaped projection of a spring 34 which in this embodiment is annular and which is supported on two diametrically opposite fixing areas 35 on the housing 36 of operating unit 12. FIGS. 2 and 3 illustrate how the latching projection 32 will be moved upward and downward when the rotary operating element 18 is being rotated.

The special characteristic of the latching device according to FIGS. 2 and 3 is to be seen in a periodic change of inclination of the surfaces of the latching depressions 26 and the latching elevations 28. This is clearly illustrated in FIGS. 4 to 6. From FIG. 4, it can be gathered that the latching depressions 26 at their deepest point 37 have a different inclination than the latching elevations 28 at their vertices 38. This is the case because the latching projection 32 is in abutment on the latching path 30 along a contact line 40 (see FIG. 6). When the latching projection 32 is arranged in a latching depression 26, the contact takes place along two contact lines 42, as shown in FIG. 7.

As evident from FIG. 6, the orientation of the surface 44 of the latching projection 32 will be changing when the projection is sliding along the latching path 30. The inclination of the latching path 30 will now follow this changed orientation of the latching projection surface 44. Thus, it is guaranteed that the latching projection 32 will always be in line contact with the latching path 30. This in turn has a wear-reducing and noise-reducing effect.

In FIGS. 8 to 10, individual phases during the immersion of the latching projection 32 into the latching depression 26 are shown. It can be seen that the latching projection 32 will be in abutment on the latching path 30 along two contact lines exclusively in its position of deepest immersion into the latching depression 26. By the contacting along the line zones, less energy will remain for thrust pulses exerted by the latching projection 32 onto the latching path 30, with the result that also the generation of noise and the reverberation will be reduced.

To make it possible that a contacting with the latching path along two contact lines will occur only in the position of the deepest immersion of the latching projection into the latching depression, the radius of the latching projection should be larger than the radius of a latching depression. In other words, when the latching projection has been immersed into the latching depression to a maximal depth, the latching projection shall not be allowed to contact the latching depression in the area of the vertex of the latching projection.

FIG. 16 shows a perspective view of the annular spring 34. In FIG. 16, it is schematically outlined that the latching projection 32 is shaped as a crimp which forms a frustoconical partial surface. The frustoconical partial surface is inclined toward the center of the annular spring 34.

Referring to FIG. 11, a translationally moveable operating element 118 comprises a latching guideway 124 which is provided on the end side of the translationally moveable operating element 118 and consists of alternately arranged latching depressions 126 and latching elevations 128. Said latching depressions 126 and latching elevations 128 form a latching path 130 along which a latching projection 32, supported in a spring-elastic manner, will slide when the translationally moveable operating element 118 is actuated, i.e. translated. FIGS. 2 and 3 illustrate how the latching projection 32 will be moved upward and downward when the translationally moveable operating element 118 is being translated.

As with the rotational embodiments in FIGS. 4-10, the special characteristic of the latching device according to FIGS. 2 and 3 is to be seen in a periodic change of inclination of the surfaces of the latching depressions 126 and the latching elevations 128. This is clearly illustrated in FIGS. 11 to 15. From FIGS. 11-15, it can be gathered that the latching depressions 126 at their deepest point 137 have a different inclination than the latching elevations 128 at their vertices 138. This is the case because the latching projection 132 is in abutment on the latching path 130 along a contact line 140 (see FIG. 15).

As evident from FIGS. 13 and 15, the orientation of the surface of the latching projection 32 will be changing when the projection is sliding along the latching path 130. The inclination of the latching path 130 will now follow this changed orientation of the latching projection surface. Thus, it is guaranteed that the latching projection 32 will always be in line contact with the latching path 130. This in turn has a wear-reducing and noise-reducing effect.

In Figs, 17 to 19, there is shown a further exemplary embodiment of a latching device comprising a latching spring with latching projection and a latching guideway which can be used in the rotary dial 14 according to FIG. 2.

According to FIG. 17, the latching guideway 24' is again substantially wave-shaped but comprises individual plane surface sections 50, 52 and 54. Designated by 50 are the surface sections forming the bottom of a latching depression 26' while the surface sections 52 and 54 form, on both sides, the flanks of a latching depression 26'. Said bilateral flanks 52, 54 extend up to the vertices 38' of the latching projections 28' and are inclined toward the center and respectively to the rotary axis 20' of the rotary operating element. Thus, the surface sections 50, 52 and 54 are arranged similar to the lateral surfaces of a pyramid having a polygonal (more than four-cornered) base surface. The annular spring 34' comprises a latching projection 32' which extends in a uniform curved shape and has a such radius that the latching projection 32' covers a latching depression 26'. The shape of the crimp-like latching projection 32' is again that of a frustoconical partial surface. Again, it is provided that the latching projection 32', when arranged centrically in a latching depression 26', contacts the latching path 30' along two contact lines 42'. Outside the center of a latching depression 26', the latching projection 32' will contact the latching path 30' merely along one contact line. Thus, for the process of immersion of the latching projection 32' into a latching depression 26', there applies the same that has been described above in connection with the description of FIG. 8 to 10.

Above, two designs of latching devices have been described, notably by way of a rotary operating element which is rotationally movable. At this point, it should be noted that the above described latching devices can be used also in an operating element designed for translational movement. Also in the latter case, the inclination of the contact line between the latching projection and the latching path will change periodically when the latching projection is sliding along the latching path. For minimization of wear and noise, there are used the same mechanisms as explained further above in the context of the two described embodiments.

The invention claimed is:

1. A latching device for a rotationally movable operating element, comprising
   a resiliently mounted latching projection and
   a latching guideway being in sliding contact with the latching projection and having a plurality of latching depressions with latching elevations arranged between them,
   the latching depressions and the latching elevations forming a substantially corrugated latching path which extends above and below a latching path extension plane and along which the latching projection slides during a relative movement between the latching guideway and the latching projection, and the latching projection having a surface which contacts the latching path along at least one contact line running substantially transversely to the longitudinal extension of the latching path, wherein, when sliding along the latching path, the latching projection experiences an upward and downward movement with periodic change of the orientation of its contact line with respect to the latching path extension plane, and wherein the surface of the latching path has a change of inclination relative to the latching path extension plane, the inclination being in a direction for the rotationally movable operating element in a radial direction relative to a circular corrugated latching path, which change of inclination is a function of the position of the contact line of the latching projection selected to maintain a contact line between the latching projection and the latching guideway at all positions during its upward and downward movement.

2. The latching device according to claim 1, wherein the surface of the latching path between the vertices of two adjacent latching elevations is formed as a frustoconical partial surface or as a part-pyramidal surface having a cone and respectively pyramid axis arranged transversely to the extension of the latching path.

3. The latching device according to claim 1, wherein the latching projection is formed on a spring arm, wherein the spring arm is fixed on at least one end and the latching projection is arranged at a distance thereto, and wherein, during the upward and downward movement of the latching projection, the spring arm is deformed in a curved shape between its fixed end and the latching projection.

4. The latching device according to claim 3, wherein the spring arm—when seen in plan view onto the latching path—extends substantially linearly and at a right angle to the orientation of the latching path, and wherein the latching projection is designed as a crimp formed with a frustoconical part-surface and having a cone axis arranged substantially along the extension of the spring arm.

5. The latching device according to claim 4, wherein the spring arm —when seen in plan view onto the latching path—extends annularly following the latching path, wherein the curved spring arm is fixed on its two ends facing away from each other and wherein the latching projection is arranged substantially in the area of the vertex of the curved spring arm and is designed as a crimp formed with a frustoconical part-surface and having a cone axis arranged radially relative to the annular shape of the spring arm.

6. The latching device according to claim 5, wherein the latching guideway extends along a circular line and wherein the spring arm is formed as an annular spring comprising a latching projection or comprising two diametrically arranged latching projections and two fixing areas arranged at a displacement of 90° relative to each latching projection.

* * * * *